United States Patent
Chiu

(10) Patent No.: US 7,251,064 B2
(45) Date of Patent: Jul. 31, 2007

(54) CALIBRATION OF AN IMAGE SCANNING SYSTEM

(75) Inventor: Chui-Kuei Chiu, Hsin-Chu (TW)

(73) Assignee: Transpacific IP, Ltd., Taipei (TW)

( * ) Notice: Subject to any disclaimer, the term of this patent is extended or adjusted under 35 U.S.C. 154(b) by 996 days.

(21) Appl. No.: 10/020,439

(22) Filed: Dec. 18, 2001

(65) Prior Publication Data

US 2003/0112480 A1 Jun. 19, 2003

(51) Int. Cl.
*H04N 1/46* (2006.01)
(52) U.S. Cl. .............. 358/504; 358/404; 358/405; 358/406; 358/504; 358/474
(58) Field of Classification Search ............... 358/404, 358/405, 406, 504, 474
See application file for complete search history.

(56) References Cited

U.S. PATENT DOCUMENTS 5,404,232 A * 4/1995 Selby ................. 358/406

* cited by examiner

*Primary Examiner*—Twyler Lamb
*Assistant Examiner*—Michael Burleson
(74) *Attorney, Agent, or Firm*—Marger, Johnson & McCollom, PC

(57) ABSTRACT

A calibration method of an image scanning system is provided. Initially, differences between adjacent sensing values of a calibration plate are respectively determined and then stored in a memory. Alternately, a difference between a base value and each of the sensing values of the calibration plate is determined and then stored in the memory. When a normal scan action is executed, simultaneously reading each difference from the memory and adding to one corresponding sensing value of image information of an object obtained by the normal scan action. As a result, the memory volume for storing calibration data is reduced and the reading of calibration data is also facilitated.

20 Claims, 4 Drawing Sheets

CALIBRATION OF AN IMAGE SCANNING SYSTEM

BACKGROUND OF THE INVENTION

1. Field of the Invention

The present invention relates to a calibration method of an image scanning system, and more particularly to a calibration method utilizing differences between calibration data.

2. Description of the Prior Art

An image system, like a scanner, typically possesses problems such as image defects or distortion of intensity owing to (a) the photo-response non-uniformity of the light source, the mirror, the lens and the charged-coupled device (CCD), (b) the aging of the system and, (c) the effects resulting from a dusty environment. Therefore, image information of an object captured by the image system is required to compensate or calibrate.

Referring to FIG. 1, which is a schematic cross-sectional view of a prior flat bed scanner 101. A white calibration plate 102 is provided outside a document sheet read area. A document sheet 104 is mounted on a document sheet table glass 103 and secured by a cover 112. The white calibration plate 102 is read prior to the reading of the document sheet 104 and the read signal is stored in a memory. When the document sheet 104 is scanned, a linear light source 105 illuminates on the document sheet 104. The reflected light from the document sheet 104 is directed to mirrors 106, 107 and 108 and directed to a charge-coupled device (CCD) 110 through a lens 109. An output of the CCD 110 as a document sheet read electrical signal is sent to an A/D converter (not shown) established within a signal processing unit (not shown) to convert the electrical signal into a digital signal. For a color image-scanning device, the charge-coupled device 110 includes three linear sensors, respectively R linear sensor, G linear sensor and B linear sensor. Each of the three linear sensors includes a plurality of photo-sensing elements, and each of the photo-sensing elements provides a sensing value for one pixel.

FIG. 2 is a flow chart of a general scanning process. Initially, at step 201, scanning a calibration plate to capture calibration data and the calibration data read from the calibration plate is stored in a calibration memory. Continuously, at step 202, a central processing unit (CPU) of a host computer reads the calibration data of each scan line of the calibration plate from the calibration memory, and proceeding computation to generate calibration data corresponding to each photo-sensing element of the linear sensor. At step 203, the calibration data are restored in the calibration memory. At step 204, a normal scan action is performed. A document sheet is scanned for capturing the image information thereof and simultaneously reading the calibration data corresponding to each photo-sensing element to calibrate the image information.

In the above calibration method, the calibration data read from the calibration plate is directly stored in the calibration memory. As an example, for a color image reading device including R, G, B three linear sensors, each of R, G, B linear sensors comprises 10000 photo-sensing elements, and the output of each photo-sensing element is converted to 8-bit digital signal and then stored in the calibration memory. In this case, a volume of the calibration memory for storing calibration data is 8*3*10000=240000 bits. This prior calibration method spends a lot of storage volume of the calibration memory and much time to read calibration data. Both of which adversely affect effectiveness of image capture and manufacturing cost for a high-speed scanning system and a high-pixel scanning device.

Accordingly, it is an intention to provide an improved calibration method to overcome the above drawbacks.

SUMMARY OF THE INVENTION

It is one objective of the present invention to provide a calibration method of an image scanning system, which utilizes differences between the calibration data to calibrate image information of an object captured by the image scanning system so as to reduce memory volume for storing calibration data and shorten time for reading calibration data, and the function of the image scanning system is significantly improved.

It is another objective of the present invention to provide a calibration method of an image scanning system, which is executed by means of an additive circuit and a compensating/computing circuit, hence the function of the image scanning system can be significantly improved without increasing the manufacturing cost.

It is a further objective of the present invention to provide a calibration method of an image scanning system, which is suitable for a high-speed image scanning system and a high-pixel linear image-scanning device.

In order to achieve the above objectives of this invention, the present invention provides a calibration method of an image scanning system. The image scanning system has an image reading device for reading image information of an object. The image reading device is provided with at least a linear sensor consisting of a plurality of photo-sensing elements. The calibration method comprises the step of reading image information from a calibration plate having a plurality of pixels at least in a row, a sensing value of each photo-sensing element of the image reading device corresponding to one of the pixels of the calibration plate. A base value may be determined in accordance with the sensing values of the calibration plate. Respective differences may be computed between the adjacent sensing values of the calibration plate. Base value and the respective differences may be stored. Image information of an object captured by the image scanning system may be calibrated. The base value is added to a first sensing value of the image information of the object and each sequential sensing value of the image information of the object is added by one of the respective differences corresponding thereto.

BRIEF DESCRIPTION OF THE DRAWINGS

The objectives and features of the present invention as well as advantages thereof will become apparent from the following detailed description, considered in conjunction with the accompanying drawings. It is to be understood, however, that the drawings, which are not to scale, are designed for the purpose of illustration and not as a definition of the limits of the invention, for which reference should be made to the appended claims.

DESCRIPTION OF THE PREFERRED EMBODIMENTS

A calibration method of an image scanning system provided by the present invention comprises initially computing differences between adjacent sensing values that correspond to calibration data reading from a calibration plate and then storing the differences in a calibration memory. For the sensing values representing calibration data reading from the calibration, each sensing value of photo-sensing elements of an image reading device including at least a linear sensor consisting of a plurality of photo-sensing elements used in the present scanning system corresponds to a pixel of the calibration plate. Alternately, the present calibration method comprises initially computing a difference between a base value and each of sensing values that correspond to calibration data reading from the calibration plate and then store the differences in the calibration memory. The base value can be a minimum sensing value or a medium value of all the sensing values, i.e. the average value of the minimum sensing value and the maximum sensing value. When a normal scan action is performed to capture image information from an object such as a document sheet, simultaneously reading each respective difference stored in the calibration memory and adding the respective difference to a corresponding sensing value of the image information of the object to execute calibration of the image information.

The adjacent sensing values of the calibration plate, whether a white calibration plate or a black calibration plate, are close to each other. The difference between the adjacent sensing values is small. It requires a smaller storage volume of the calibration memory for storing the differences than that for directly storing all the sensing values. Thus, the storage volume of the calibration memory for storing the differences is significantly reduced, in the present invention. On the other hand, in case the differences between the adjacent sensing values are below 7 levels, only 4-bit memory volume is sufficient for storing a difference. For a reading period of 8-bit data per time, it can read two 4-bit data during one reading period. Therefore, the reading of calibration data is also facilitated in the present invention. As a result, the calibration of the image information of the object is accelerated.

The present calibration method of an image scanning system will be described in detail in accordance with the following preferred embodiments.

Figure 1:
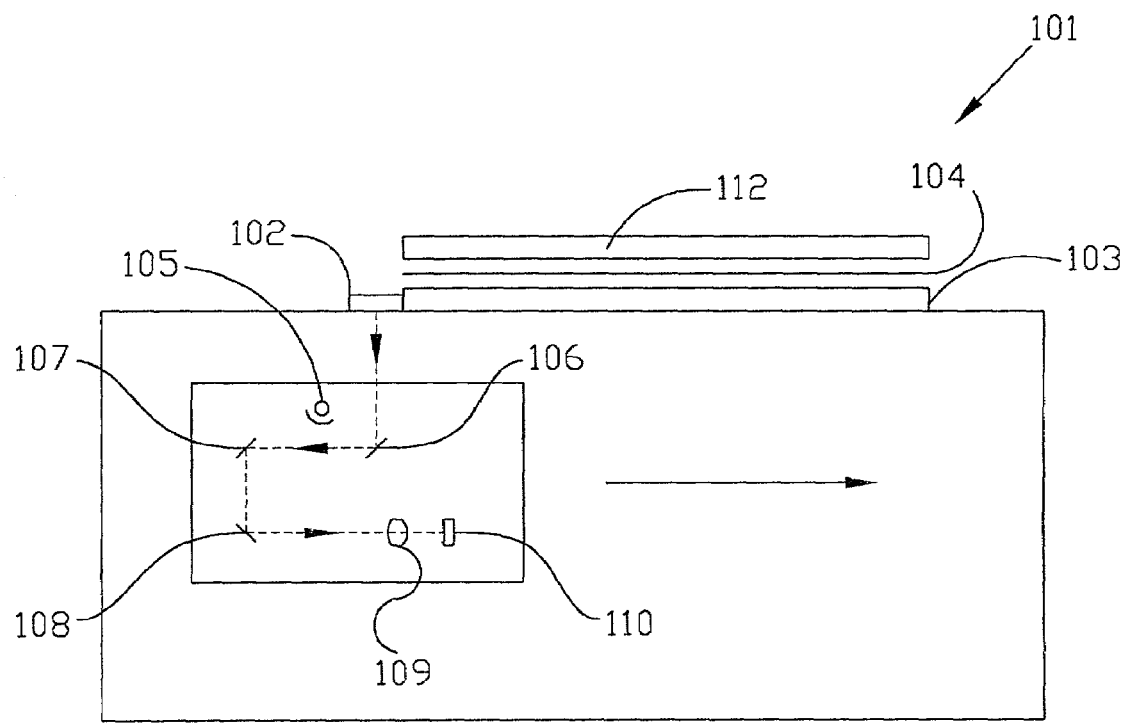
FIG. 1 is a schematically cross-sectional view of a prior flat bed scanner.
Figure 2:
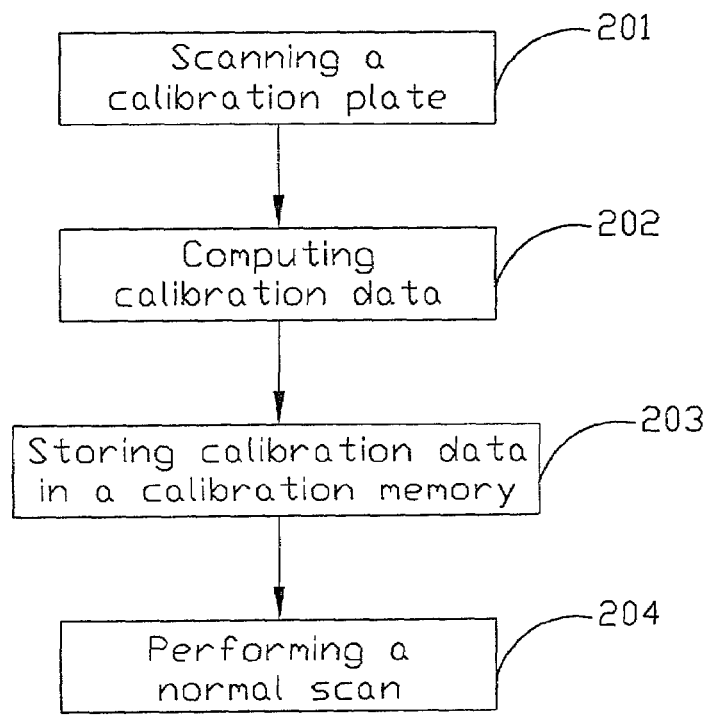
FIG. 2 is a flow chart showing a general scanning process.
Figure 3:
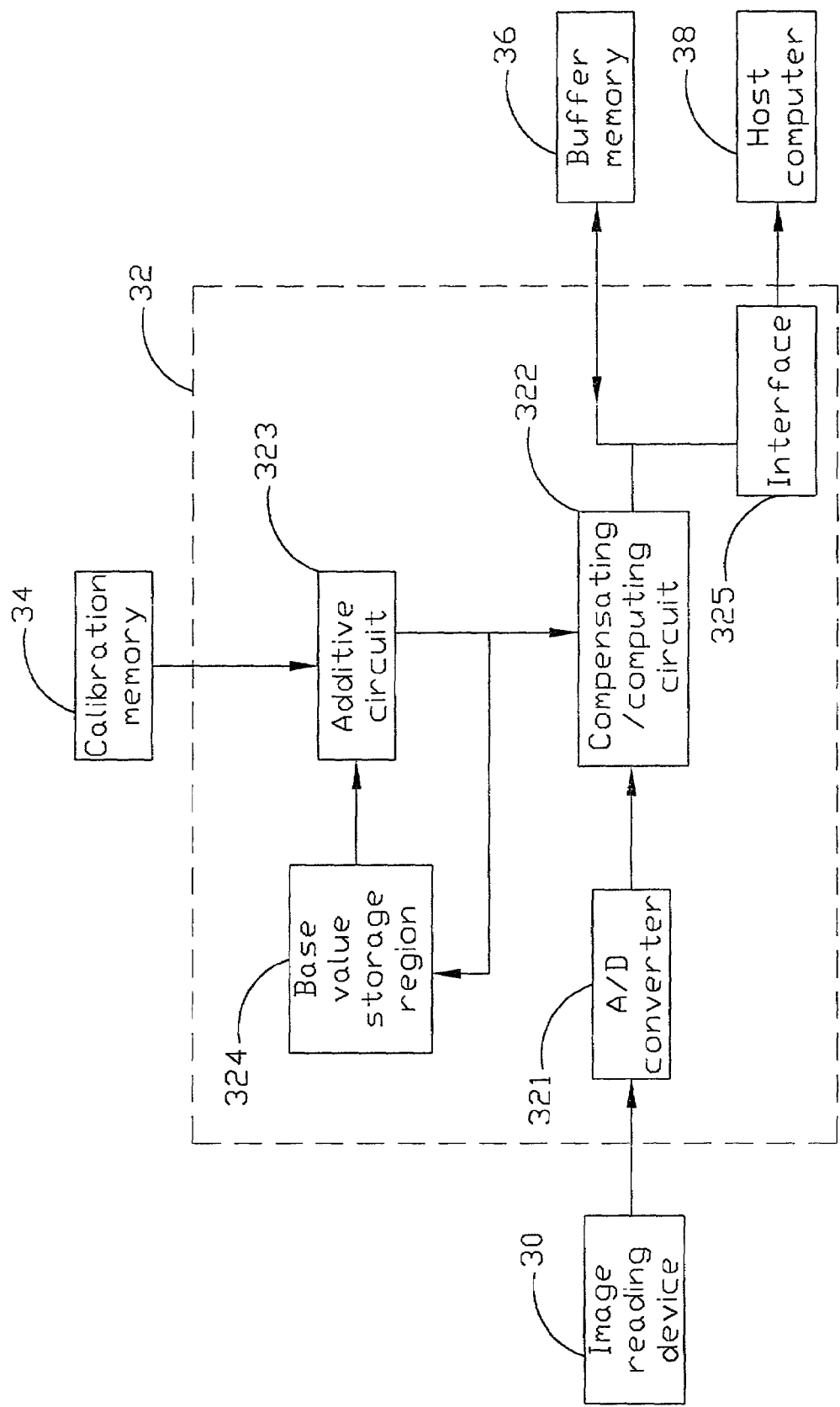
FIG. 3 is a functional block diagram used for executing the present calibration method.
Figure 4:
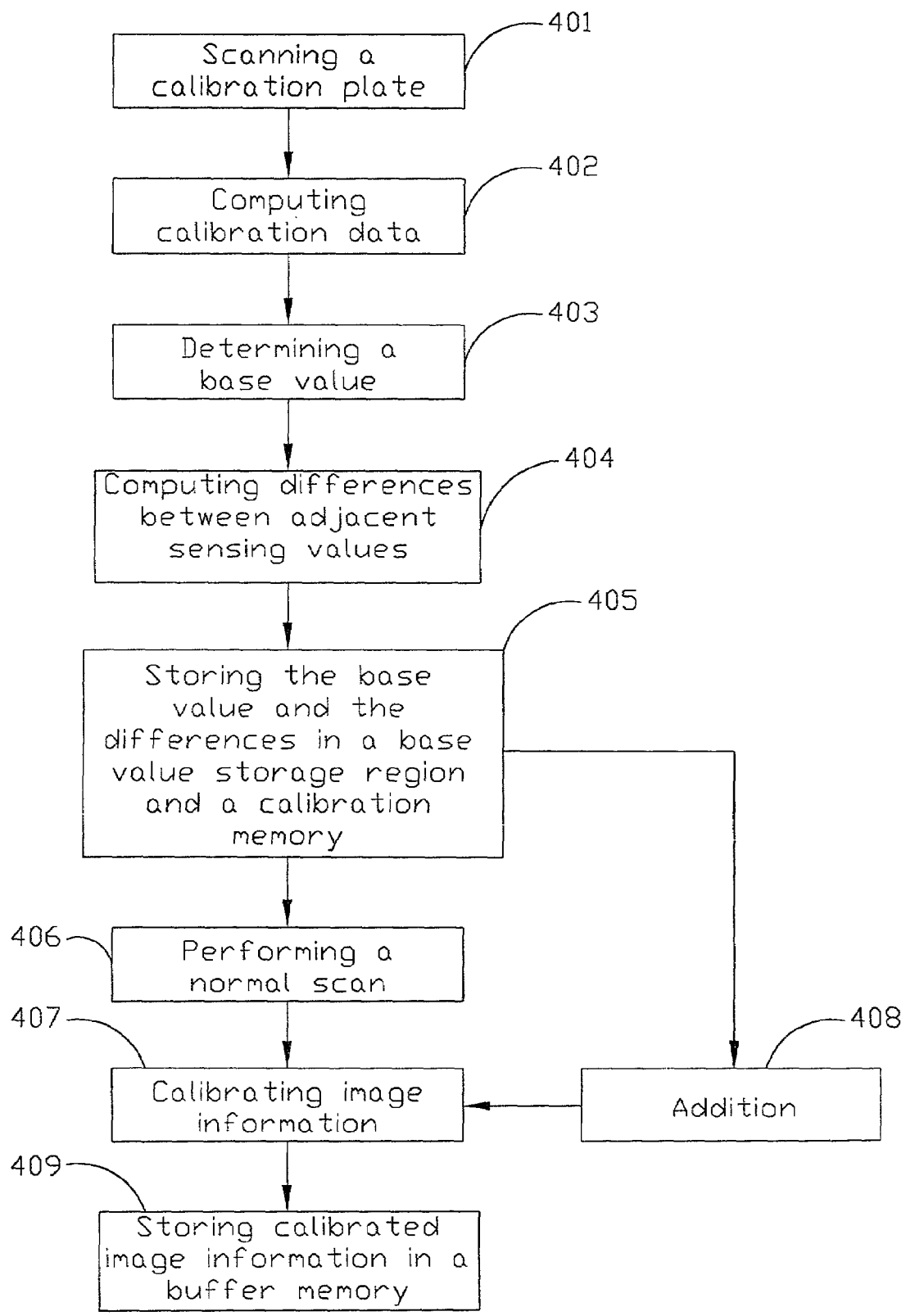
FIG. 4 is a flow chart of a first preferred embodiment of the present invention.

FIG. 3 is a functional block diagram used for executing the present calibration method. FIG. 4 is a flow chart of a first preferred embodiment of the present invention; and FIG. 5 is a flow chart of a second preferred embodiment of the present invention.

Referring to FIG. 3 and FIG. 4, in the first preferred embodiment of the present calibration method, at step 401, initially, scanning a calibration plate, for example, a white calibration plate or a black calibration plate, to capture image information of the calibration plate through an image reading device 30 for being used as calibration data. The calibration plate has a plurality of pixels at least in a row. The image reading device 30 comprises at least a linear sensor consisting of a plurality of photo-sensing elements. A sensing value of each photo-sensing element corresponds to a pixel of the calibration plate. Continuously, at step 402, a central processing unit (CPU) of a host computer 38 computes calibration data of each scan line reading from the calibration plate to generate calibration data corresponding to each photo-sensing element, i.e. a sensing value of each photo-sensing element. At step 403, a base value may be determined in accordance with all the sensing values of the image reading device 30 reading from the calibration plate. The base value can be a minimum sensing value or an average value of a minimum sensing value and a maximum sensing value. Continuously, at step 404, the central processing unit (CPU) computes differences between adjacent sensing values; and at step 405, storing the base value and the differences respectively in a base value storage region 324 and a calibration memory 34. A bit number used for storing one of the differences is determined depending on a distribution range of the differences. For example, when the differences of the adjacent sensing values are below 7 levels, i.e. between negative 7 levels and positive 7 levels, it only requires 4-bit memory volume for storing one of the differences. At step 406, performing a normal scan action to capture image information of an object through the image reading device 30, and then sending the output of the image reading device 30 to an analog/digital converter (A/D converter) 321 for digitizing a sensing value of each photo-sensing elements of the image reading device 30. At step 407, the central processing unit of the host computer 38 simultaneously reads the base value or the difference, corresponding to each photo-sensing element, respectively from the base value storage region 324 and the calibration memory 34, and calibrating the image information of the object through a compensating/computing circuit 322; wherein, through an additive circuit (step 408), the base value is added to a first sensing value of the image information of the object and each of the sequential sensing values of the image information is added by the difference corresponding thereto. As a result, each of the sensing values of the image information of the object is recovered to a true value. At step 409, the calibrated image information of the object is stored in a buffer memory 36. The calibrated image information stored in the buffer memory 36 is sent to the host computer 38 through an interface 325. The A/D converter 321, compensating/computing circuit 322 and additive circuit 323 can be established in an application specific integrated circuit (ASIC) 32. Furthermore, subsequent image information captured by a normal scan action from another object can be calibrated via step 407 and step 408.

Figure 5:
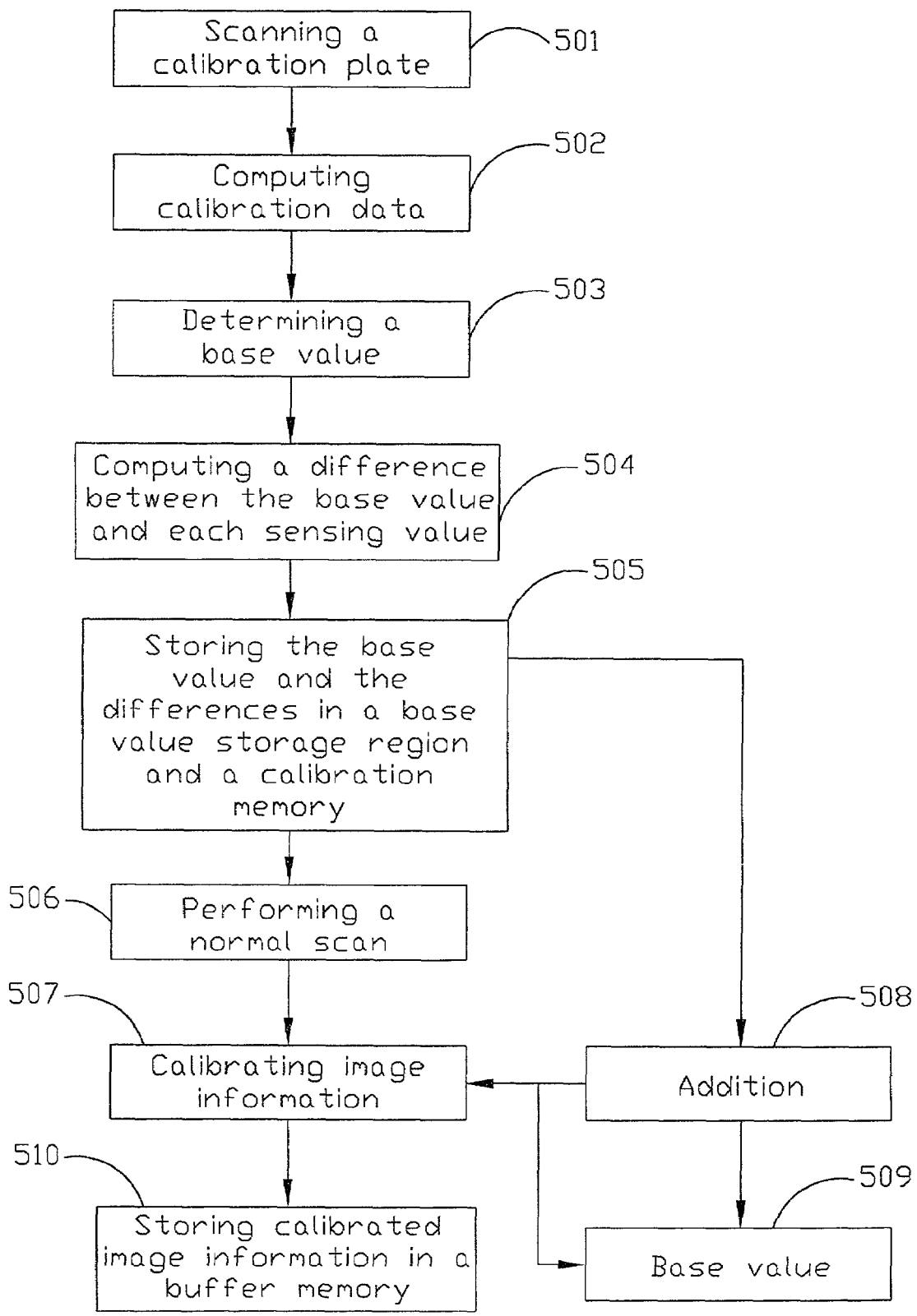
FIG. 5 is a flow chart of a second preferred embodiment of the present invention.

Referring to FIG. 5, in a second preferred embodiment of the present invention, steps 501, 502 and 503 are the same with steps 401, 402 and 403 of the first preferred embodiment. At step 504, the central processing unit of the host computer 38 computes a difference between the base value and each sensing value of the calibration plate; and at step 505, storing the base value and the differences respectively in the base value storage region 324 and the calibration memory 34. It is like the first preferred embodiment, a bit number used for storing one of the differences is determined depending on a distribution range of the differences. At step 506, performing a normal scan action to capture image information of an object through the image reading device 30, and then sending the output of the image reading device 30 to an analog/digital converter (A/D converter) 321 for digitizing a sensing value of each photo-sensing element of the image reading device 30. At step 507, the central processing unit of the host computer 38 simultaneously reads the base value and the difference corresponding to each photo-sensing element from the base value storage region 324 and the calibration memory 34, and calibrating the image information of the object through a compensating/computing circuit 322; wherein, via step 508 and step 509, the base value and a corresponding difference are added to each sensing value of the image information of the object through the additive circuit 323. As a result, each of the sensing values of the image information of the object is recovered to a true value. At step 510, the calibrated image information of the object is stored in a buffer memory 36. Furthermore, subsequent image information captured by a normal scan action from another object can be calibrated via step 507 through step 509.

In accordance with the foregoing, the present calibration method can reduce the storage volume of the calibration memory for storing calibration data. More specifically, the adjacent sensing values of the calibration plate, whether a white calibration plate or a black calibration plate, are close to each other. The difference between the adjacent sensing values is small. In case the differences between the adjacent sensing values are below 7 levels, only 4-bit memory volume is sufficient for storing a difference. Moreover, for a reading period of 8-bit data per time, it can read two 4-bit data during one reading period. Therefore, the reading of calibration data is facilitated in the present invention. The two advantages of reducing storage volume of calibration data and shortening the reading of the calibration data are more apparent in a high-speed image scanning system and a high-pixel linear scanning device.

The preferred embodiments are only used to illustrate the present invention, not intended to limit the scope thereof. Many modifications of the embodiments can be made without departing from the spirit of the present invention.

What is claimed is:

1. A calibration method comprising:
    reading image information comprising sensing values from a plurality of pixels of an image of a calibration plate, wherein a sensing value corresponds to one of said pixels;
    determining a base value in accordance with said sensing values of said calibration plate;
    computing respective differences between adjacent sensing values;
    storing said base value and said respective differences; and
    calibrating image information of an object, wherein said base value is added to a first sensing value of the image information of said object and each sequential sensing value of the image information of said object is added by one of said respective differences corresponding thereto.

2. The calibration method of claim 1, wherein said base value comprises a minimum value among said sensing values of said calibration plate.

3. The calibration method of claim 1, wherein said base value comprises a medium value of said sensing values of said calibration plate.

4. The calibration method of claim 1, further comprising determining storage bits of one of said respective differences depending on a distribution range of said respective differences.

5. The calibration method of claim 1, further comprising executing said calibrating image information of said object at least via an additive circuit and a compensating/computing circuit.

6. The calibration method of claim 1, wherein reading image information from a plurality of pixels of a calibration plate comprises reading image information from a plurality of pixels of a white calibration plate or a black calibration plate.

7. A calibration method comprising:
    reading image information comprising sensing values from a plurality of pixels of an image of a calibration plate, wherein a sensing value corresponds to one of said pixels;
    determining a base value in accordance with said sensing values of said calibration plate;
    computing a difference between said base value and each of said sensing values of said calibration plate;
    storing said base value and said differences; and
    calibrating image information of an object, wherein each sensing value of the image information of said object is added by said base value and one of said differences corresponding thereto.

8. The calibration method of claim 7, wherein said base value comprises a minimum value among said sensing values of said calibration plate.

9. The calibration method of claim 7, wherein said base value comprises a medium value of said sensing values of said calibration plate.

10. The calibration method of claim 7, further comprising determining storage bits of one of said respective differences depending on a distribution range of said respective differences.

11. The calibration method of claim 7, further comprising executing said calibrating image information of said object at least via an additive circuit and a compensating/computing circuit.

12. The calibration method of claim 7, wherein reading image information from a plurality of pixels of a calibration plate comprises reading image information from a plurality of pixels of a white calibration plate or a black calibration plate.

13. An apparatus, comprising:
    means for reading image information comprising sensing values from a plurality of pixels of an image of a calibration plate, wherein a sensing value corresponds to one of said pixels;
    means for determining a base value in accordance with said sensing values of said calibration plate;
    means for computing respective differences between adjacent sensing values;
    means for storing said base value and said respective differences; and
    means for calibrating image information of an object, wherein said base value is added to a first sensing value of the image information of said object and each sequential sensing value of the image information of said object is added by one of said respective differences corresponding thereto.

14. The apparatus of claim 13, wherein said base value comprises a minimum value among said sensing values of said calibration plate.

15. The apparatus of claim 13, wherein said base value comprises a medium value of said sensing values of said calibration plate.

16. The apparatus of claim 13, further comprising means for determining storage bits of one of said respective differences depending on a distribution range of said respective differences.

17. A computer readable storage medium having stored thereon instructions, that, if executed by a computer, perform a method comprising:

reading image information comprising sensing values from a plurality of pixels of an image of a calibration plate, wherein a sensing value corresponds to one of said pixels;

determining a base value in accordance with said sensing values of said calibration plate;

computing a difference between said base value and each of said sensing values of said calibration plate;

storing said base value and said differences; and calibrating image information of an object, wherein each sensing value of the image information of said object is added by said base value and one of said differences corresponding thereto.

18. The computer readable storage medium of claim 17, wherein said base value comprises a minimum value among said sensing values of said calibration plate.

19. The computer readable storage medium of claim 17, wherein said base value comprises a medium value of said sensing values of said calibration plate.

20. The computer readable storage medium of claim 17, wherein the instructions, if executed, further result in determining storage bits of one of said respective differences depending on a distribution range of said respective differences.

* * * * *